United States Patent
Thompson et al.

(10) Patent No.: US 8,081,674 B2
(45) Date of Patent: Dec. 20, 2011

(54) METHODS AND SYSTEM FOR DETERMINING A DOMINANT IMPAIRMENT OF AN IMPAIRED COMMUNICATION CHANNEL

(75) Inventors: Robert J. Thompson, Monroeton, PA (US); Michael J. Cooper, Marietta, GA (US); Charles S. Moore, Langhorne, PA (US); John L. Moran, III, Uxbridge, MA (US)

(73) Assignee: General Information Corporation, Horsham, PA (US)

( * ) Notice: Subject to any disclaimer, the term of this patent is extended or adjusted under 35 U.S.C. 154(b) by 560 days.

(21) Appl. No.: 12/342,733

(22) Filed: Dec. 23, 2008

(65) Prior Publication Data

US 2010/0158093 A1 Jun. 24, 2010

(51) Int. Cl.
*H04B 3/46* (2006.01)
*H04B 17/00* (2006.01)
*H04B 1/20* (2006.01)
*H03H 7/30* (2006.01)
*H03H 7/40* (2006.01)
*H03K 5/159* (2006.01)

(52) U.S. Cl. ....................... 375/224; 375/229
(58) Field of Classification Search .................. 370/249, 370/352, 232, 472, 241, 486; 375/224, 257
See application file for complete search history.

(56) References Cited

U.S. PATENT DOCUMENTS

| | | | |
|---|---|---|---|
| 5,251,324 A | 10/1993 | McMullan, Jr. | |
| 5,390,339 A | 2/1995 | Bruckert et al. | |
| 5,606,725 A | 2/1997 | Hart | |
| 5,631,846 A | 5/1997 | Szurkowski | |
| 5,694,437 A | 12/1997 | Yang et al. | |
| 5,790,523 A | 8/1998 | Ritchie et al. | |
| 5,939,887 A | 8/1999 | Schmidt et al. | |
| 5,943,604 A | 8/1999 | Chen et al. | |
| 6,032,019 A | 2/2000 | Chen et al. | |
| 6,272,150 B1 | 8/2001 | Hrastar et al. | |
| 6,278,730 B1 | 8/2001 | Tsui et al. | |
| 6,321,384 B1 | 11/2001 | Eldering | |
| 6,434,583 B1 | 8/2002 | Dapper et al. | |
| 6,559,756 B2 | 5/2003 | Al-Araji et al. | |
| 6,570,394 B1 | 5/2003 | Williams | |
| 6,570,913 B1 | 5/2003 | Chen | |
| 6,711,134 B1 | 3/2004 | Wichelman et al. | |
| 6,741,947 B1 | 5/2004 | Wichelman et al. | |
| 6,757,253 B1 | 6/2004 | Cooper et al. | |

(Continued)

OTHER PUBLICATIONS

Motorola, "White Paper: Expanding Bandwidth Using Advanced Spectrum Management", pp. 1-12; Sep. 25, 2003.

(Continued)

*Primary Examiner* — David C. Payne
*Assistant Examiner* — Wednel Cadeau
(74) *Attorney, Agent, or Firm* — Stewart M. Wiener

(57) ABSTRACT

Methods are described for identifying a dominant impairment on a communication channel impaired by an interference issue. The methods include systematic examination of total power loading, systematic examination of signal power reduction, statistical examination of communication channel noise power, and systematic examination of interleaver effectiveness. Each relates to automatically diagnosing and characterizing distortion-based interference issues by monitoring the performance of a communication channel during a testing procedure. These methods enable a technician or engineer to remotely diagnose distortion-based interference issues relatively quickly without having to use external test equipment and without having to deploy technicians to various locations within the cable plant. A system by which these methods can be implemented is also disclosed.

20 Claims, 9 Drawing Sheets

U.S. PATENT DOCUMENTS

| | | |
|---|---|---|
| 6,772,388 B2 | 8/2004 | Cooper et al. |
| 6,772,437 B1 * | 8/2004 | Cooper et al. ............... 725/111 |
| 6,853,932 B1 | 2/2005 | Wichelman et al. |
| 6,961,370 B2 | 11/2005 | Chappell |
| 7,139,283 B2 | 11/2006 | Quigley et al. |
| 7,152,025 B2 | 12/2006 | Lusky et al. |
| 7,246,368 B1 * | 7/2007 | Millet et al. ............... 725/111 |
| 7,274,735 B2 | 9/2007 | Lusky et al. |
| 7,315,573 B2 | 1/2008 | Lusky et al. |
| 7,315,967 B2 | 1/2008 | Azenko et al. |
| 7,451,472 B2 | 11/2008 | Williams |
| 7,876,697 B2 | 1/2011 | Thompson et al. |
| 2003/0028898 A1 | 2/2003 | Howald |
| 2003/0179770 A1 | 9/2003 | Reznic et al. |
| 2003/0185176 A1 | 10/2003 | Lusky et al. |
| 2005/0025145 A1 | 2/2005 | Rakib et al. |
| 2005/0058082 A1 | 3/2005 | Moran, III et al. |
| 2005/0122996 A1 | 6/2005 | Azenkot et al. |
| 2005/0183130 A1 | 8/2005 | Sadja et al. |
| 2005/0198688 A1 | 9/2005 | Fong |
| 2005/0226161 A1 | 10/2005 | Jaworski |
| 2006/0250967 A1 * | 11/2006 | Miller et al. ............... 370/241 |
| 2007/0002752 A1 | 1/2007 | Thibeault et al. |
| 2007/0223920 A1 | 9/2007 | Moore et al. |
| 2007/0245177 A1 | 10/2007 | Cooper et al. |
| 2008/0056713 A1 | 3/2008 | Cooper et al. |
| 2008/0101210 A1 | 5/2008 | Thompson et al. |
| 2008/0140823 A1 | 6/2008 | Thompson et al. |
| 2008/0200129 A1 | 8/2008 | Cooper et al. |
| 2010/0158093 A1 | 6/2010 | Thompson et al. |

OTHER PUBLICATIONS

Office Action, U.S. Appl. No. 12/342,722, Jul. 23, 2010.

* cited by examiner

METHODS AND SYSTEM FOR DETERMINING A DOMINANT IMPAIRMENT OF AN IMPAIRED COMMUNICATION CHANNEL

CROSS-REFERENCE TO RELATED APPLICATIONS

This application is related to U.S. Pat. No. 8,000,254 of Thompson et al. titled "Methods and System for Determining a Dominant Impairment of an Impaired Communication Channel" filed on Dec. 23, 2008.

FIELD OF THE INVENTION

Methods and a system for characterizing impairments on a communication channel of a network are disclosed, and more particularly, processes for monitoring the performance of a communication channel impaired with a noise and/or narrowband interference issue is provided in a manner permitting a dominant impairment to be identified.

BACKGROUND OF THE INVENTION

Hybrid fiber coaxial (HFC) cable television systems include a so-called headend which provides communications between end users in the HFC network and IP/PSTN networks. The headend typically contains a cable modem termination system (CMTS) containing several receivers, each receiver handling communications between hundreds of end user network elements. An example of a CMTS is the Motorola Broadband Service Router 64000 (BSR 64000).

The headend is generally connected to several nodes and each node is connected to many network elements. Examples of network elements include cable modems, set top boxes, televisions equipped with set top boxes, data over cable service interface specification (DOCSIS) terminal devices, media terminal adapters (MTA), and the like. A single node may be connected to hundreds of modems.

A typical HFC network uses optical fiber for communications between the headend and the nodes and coaxial cable for communications between the nodes and the end user network elements. Downstream (also referred to as forward path) optical communications over the optical fiber are typically converted at the nodes to RF communications for transmission over the coaxial cable. Conversely, upstream (also referred to as return path) RF communications from the network elements are provided over the coaxial cables and are typically converted at the nodes to optical communications for transmission over the optical fiber. The return path optical link (the optical components in the HFC network, e.g. the transmission lasers, optical receivers, and optical fibers) contribute to the performance of the HFC network. More particularly, the optical components contribute to the quality of signals received by the CMTS from the network elements, and may cause distortion of the signals or otherwise degrade their quality.

The RF signals are generally in the form of modulated RF signals, and several modulation schemes exist with different levels of complexity. The use of the highest order modulation scheme is typically desired; however, complex modulation schemes are generally more sensitive to impairments. For instance, a given amount of phase noise or narrow band interference may prevent an HFC network from effectively using preferred modulation schemes because phase noise and/or narrowband interference often limits the level of modulation complexity that may be transmitted over an upstream HFC plant.

A phase noise impairment is generated through modulation and demodulation processes between the DOCSIS terminal devices (MTA or cable modems) and the CMTS. This noise generally combines with and potentially degrades the noise already present within the downstream or upstream HFC plant. In contrast, a distortion-based impairment is typically generated by non-linear active components in the forward or return path. Distortion may produce appreciable narrowband and/or wideband spurious signals which can interfere with frequencies used by the CMTS and DOCSIS terminal devices.

An accurate diagnosis of phase noise and/or distortion-based impairment issues has conventionally required technicians and/or engineers to be positioned at multiple locations within the HFC plant to simultaneously inject test signals at suspected DOCSIS terminal device locations so that the performance of the network can be accessed at the headend location with specialized test equipment, such as a vector signal analyzer. The problem with this diagnostic approach is that it is manual, time consuming and expensive.

SUMMARY OF THE INVENTION

This disclosure describes several automated processes for determining or characterizing a dominant impairment of a communication channel. Typically, the communication will have been pre-identified as being impaired with a phase noise and/or narrowband interference issue, and the tests described below are used to promptly identify the dominant impairment so that appropriate corrective actions can be taken.

According to a first method, a so-called "total power loading" test is used on the impaired communication channel to determine the dominant impairment. Initial total power loading, equal to the total power of RF energy present within a bandwidth of interest, is measured on a test channel, and a selected network element is remotely instructed to transmit a first test signal on the test channel at initial total power loading. The first test signal is monitored at a headend of the test channel and at least one of modulation error ratio ($MER_0$), signal-to-noise ratio ($SNR_0$), packet error rate ($PER_0$), and bit error rate ($BER_0$) are measured. Thereafter, the network element is remotely instructed to transmit a second test signal on the test channel; however, this time the test signal is transmitted at a different power level such that initial total power loading is adjusted by a pre-determined amount, such as being increased by 1 dB. The second test signal is received at the headend and at least one of modulation error ratio ($MER_1$), signal-to-noise ratio ($SNR_1$), packet error rate ($PER_1$), and bit error rate ($BER_1$) are measured. Thereafter, the above referenced measurements are comparing to determine whether the measurements degraded, improved, or stayed about the same as a result in the change of total power loading. Based on this information, the dominant impairment can be readily identified (i.e. non-linear distortion, noise, or neither).

According to a second method, a so-called "signal power reduction" test is used on the impaired communication channel to determine the dominant impairment. A network element is selected and remotely instructed to transmit a first test signal on a test channel at an initial transmit power level, and this first test signal is received at a headend of the test channel where a measurement is taken of at least one of modulation error ratio ($MER_0$), signal-to-noise ratio ($SNR_0$), packet error rate ($PER_0$), and bit error rate ($BER_0$). Thereafter, the network element is instructed to transmit a second test signal on the test channel at a transmit power level different than that of the initial transmit power level, such as at a power level reduced by 1 dB. The second test signal is monitored at the headend of the test channel, and at least one of modulation error ratio ($MER_1$), signal-to-noise ratio ($SNR_1$), packet error rate ($PER_1$), and bit error rate ($BER_1$) is measured. The above referenced measurements are compared to determine an actual amount of degradation or improvement therebetween. Thereafter, a theoretically expected amount of degradation or improvement assuming an Additive White Gaussian Noise (AWGN) dominated SNR condition for the text channel is compared to the actual amount of degradation or improvement measured, and based on this information, a distortion-dominated impairment can be distinguished from a noise-dominated impairment.

According to a third method, a so-called "noise power" test is used on the impaired communication channel to determine the dominant impairment. For this method, a sample size (N), a test duration, and a query rate for developing a complementary cumulative density function (CCDF) statistical measure of test signal measurements on a test channel is established. Thereafter, a network element is selected and remotely instructed to transmit test signals on the test channel. The test signals are monitored at a headend of the test channel, and measurements of signal-to-noise ratio (SNR) and Receive Power Level (Pr) are recorded for samples 1 to N at the established query rate for the established duration. From this recorded information, a CCDF for Receive Noise Power Level (Nr) is developed, where Nr=Pr−SNR for each sample. A theoretically expected CCDF of Receive Noise Power Level for an Additive White Gaussian Noise (AWGN) dominated impairment on the test channel is separately obtained and is compared to the CCDF for Receive Noise Power Level developed from samples 1 to N. Based on this comparison, a distortion-dominated impairment is readily distinguished from a noise dominated impairment.

According to a fourth method, a so-called "interleaver effectiveness" test is used on the impaired communication channel to determine burst duration nature of a dominant impairment, which in turn is useful for determining the dominant impairment. A minimum acceptance performance value is obtained for at least one of modulation error ratio ($MER_{MIN}$), signal-to-noise ratio ($SNR_{MIN}$), packet error rate ($PER_{MIN}$), and bit error rate ($BER_{MIN}$) for a test signal on a test channel. A current interleaver setting of the test channel is set to a lowest available setting, and a network element is remotely instructed to transmit a test signal on the test channel. The test signal is monitored at a headend of the test channel, and at least one of modulation error ratio (MER), signal-to-noise ratio (SNR), packet error rate (PER), and bit error rate (BER) is measured. This measurement is compared to the corresponding minimum acceptance performance value for purposes of determining whether the current interleaver setting represents an upper bound of the dominant impairment of the test channel. If this is true, the current interleaver setting is recorded as representing an upper bound; if not, the current interleaver setting is reset to the next highest interleaver setting and new measurements and comparisons are undertaken until an interleaver setting representing an upper bound of the dominant impairment is determined.

In accordance with the principles of the above described methods, a system for determining or characterizing a dominant impairment of an impaired communication channel is provided. The system includes a cable modem termination system (CMTS) unit at a headend of a test channel configured to remotely instruct a network element to transmit test signals on a return path of a test channel. The CMTS unit has a receiver configured to monitor the test signals from the network element and a processing unit configured to record any of the above referenced measurements. The processing unit is also configured to make any of the above referenced comparisons and to automatically determine from the results of the comparisons whether distortion or noise is the dominant impairment or a burst protection setting that represents an upper bound of the dominant impairment on the test channel.

BRIEF DESCRIPTION OF THE DRAWINGS

The following drawings serve to illustrate the principles of the invention.

DETAILED DESCRIPTION OF THE INVENTION

Before turning to detailed descriptions with respect to processes for determining and/or characterizing the nature of the dominant impairment present on a communication network, a description of a basic network set-up and associated apparatus and elements is provided.

Figures 1, 2:
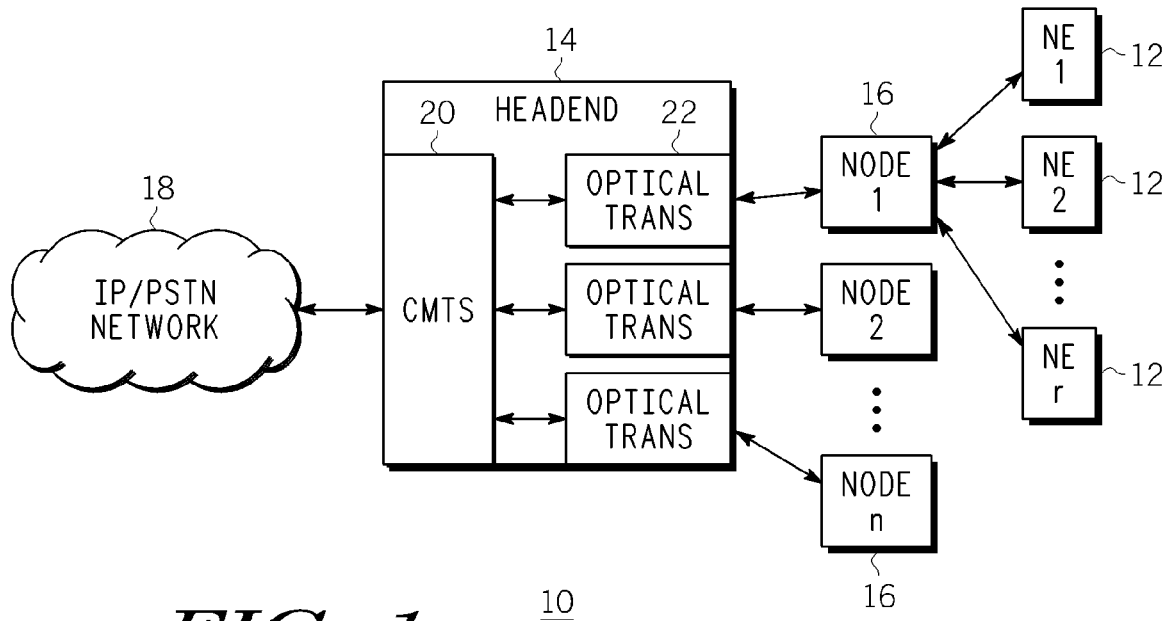
FIG. 1 illustrates an exemplary network in accordance with the principles of the invention.
FIG. 2 illustrates an exemplary CMTS architecture in accordance with the principles of the invention.

For this purpose and by way of example, FIG. 1 illustrates an exemplary network 10, such as an HFC network, including a plurality of end user terminal network elements 12, such as cable modems, set top boxes, televisions equipped with set top boxes, DOCSIS terminal devices, MTAs or any other like element. The terminal network elements 12 interconnect to a headend 14 of the network 10 via nodes 16 and one or more taps (not shown). In turn, the headend 14 interconnects to an IP (Internet Protocol) and/or PSTN (Public Switched Telephone Network) network 18.

As illustrated in FIG. 1, the headend 14 includes a cable modem termination system (CMTS) unit 20 and optical transceivers 22 which provide optical communications to and from the CMTS 20 through optical fiber to the nodes 16. Typically, a plurality of nodes 16 connect to the headend 14, the headend 14 contains a plurality of CMTS units 20, and each CMTS 20 contains a plurality of receivers which communicate with a plurality of network elements 12. For example, each CMTS 20 may have eight or more receivers, and each receiver may communicate with hundreds of network elements 12.

Preferably, the CMTS 20 contains a spare receiver which is not continuously configured to network elements 12, but may be selectively configured to network elements 12. Such a spare receiver and its use is described in commonly-assigned, co-pending U.S. patent application Ser. No. 11/171,066, filed on Jun. 30, 2005 and titled "Automated Monitoring of a Network". This co-pending application published as U.S. Patent Application Publication No. 2007/0002752 A1 on Jan. 4, 2007.

The spare receiver can be used to monitor performance on any of the upstream ports without impacting performance of the other receivers. It can non-obtrusively gain access to all of the return nodes connected to one of the receiver ports and perform tests on any available network element 12 on any one of the receiver port's supported nodes 16. Further, the spare receiver can be used to measure traffic and performance in real-time on any given live receiver port.

FIG. 2 illustrates a logical architecture of an exemplary CMTS 20. As illustrated, the CMTS 20 includes a processing unit 24 having a microprocessor 26 that receives information, such as instructions and data from a RAM 28 and a ROM 30. The processing unit 24 controls the operation of the CMTS 20 and RF communication signals to be sent by the network elements 12 to the CMTS 20. The processing unit 24 is preferably connected to a display 32 which may display status information such as whether station maintenance (SM) is being performed or a receiver is in need of load balancing. An input keypad 34 may also be connected to the processing unit 24 to permit an operator to provide instructions, processing requests and/or data to processing unit 24.

The CMTS 20 also includes an RF transceiver (transmitter/receiver) unit 36 having a plurality of transmitters 38 and receivers 40 providing bi-directional communication capability with a plurality of the network elements 12 through optical transceivers 22, nodes 16 and a plurality of network taps (not shown). The CMTS 20 may contain a plurality of RF receivers 40, such as eight RF receivers and a spare RF receiver as discussed above. Each RF receiver 40 may provide support for a hundred or more network elements 12.

By way of example, the RF receiver 40 can be a Broadcom 3140 receiver that includes a demodulator unit 42 and an equalizer 44 to which received RF signals are provided, for instance, for purposes of acquiring equalizer values and burst modulation error ratio (MER) measurements, packet error rate (PER) and bit error rate (BER). The equalizer 44 can be a multiple tap linear equalizer (e.g. a twenty-four tap linear equalizer), which also is known as a feed forward equalizer (FFE). The equalizer 44 can be integrally contained in RF receiver 40, or alternatively, may be provided as a separate device. The communication characteristics of each receiver 40 may be stored on ROM 30 or RAM 28, or may be provided from an external source.

RF transceiver unit 36 also includes a modulator 46 which receives downstream signals from equalizer unit 44, modulates the signals, and provides the modulated signals to RF transmitters 38. The modulator 46 and demodulator 42 are capable of modulation schemes of various levels of complexity. For example, some DOCSIS 2.0 modulation schemes which may be used in order of level of complexity include, but are not limited to: 16 QAM, 32 QAM, 64 QAM and 128 QAM. In the preferred implementation, microprocessor 26 provides instructions to the network elements 12 as to which modulation scheme is to be used during communication.

Figure 3:
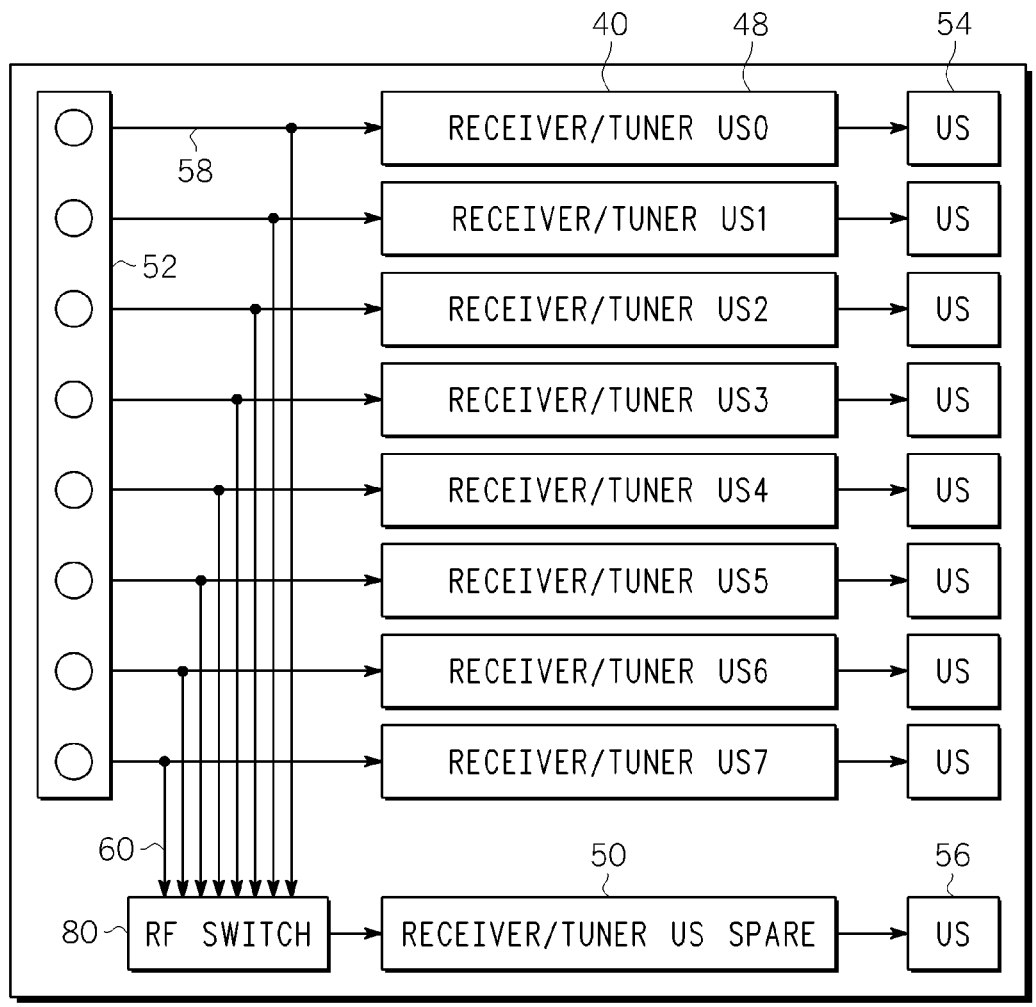
FIG. 3 illustrates an exemplary receiver arrangement which may communicate with an exemplary CMTS of the present invention.

FIG. 3 illustrates a logical arrangement of a group of receivers 40 of the CMTS 20 including a set of primary receivers 48 and a spare receiver 50. The spare receiver 50 is tapped into each of the ports 52 of the primary receivers 48 via an RF switch 80 in a non-intrusive manner. As illustrated, the receiver ports 52 of the CMTS 20 which may be in the form of Amphenol connectors provided to allow cables, e.g. coaxial cables, (not shown) to be connected with the primary receivers 48. The primary receivers 48 provide data signals to and within the CMTS 20 through ports 54, and spare receiver 50 provides data signals to the CMTS 20 through port 56.

Spare receiver 50 preferably taps into signal lines 58 of primary receiver ports 52 via signal lines 60, and the taps are preferably located where the cable signal comes from receiver ports 52 into the primary receivers 48 so both the connected primary receiver 48 and the spare receiver 50 receive the same signal. Those of skill in the art will appreciate that each of the primary receivers 48 receives signals according to different communication characteristics, e.g. communication on a different frequency (RF band) and communication protocol. Spare receiver 50 is tunable to the RF bands of each of the primary receivers 48 and typically connects (matrices) with only one primary receiver 48 at a time.

When a network operator initiates a testing operation, as will be described in detail below, they may select any registered network element 12 of their choice or the CMTS 20 may select the network element 12. Once the network element 12 has been selected it is moved (tuned to the frequency) according to the spare receiver testing data passed to it and the results are measured. Once the testing measurements are completed the network element 12 is moved back (instructed to retune to the frequency of the primary receiver) to its original primary receiver 48. This whole process is preferably performed without deregistering the network element 12 from the network 10 to avoid disrupting the subscriber's service or any other services on the primary receiver 48 to other subscribers.

Figure 4:
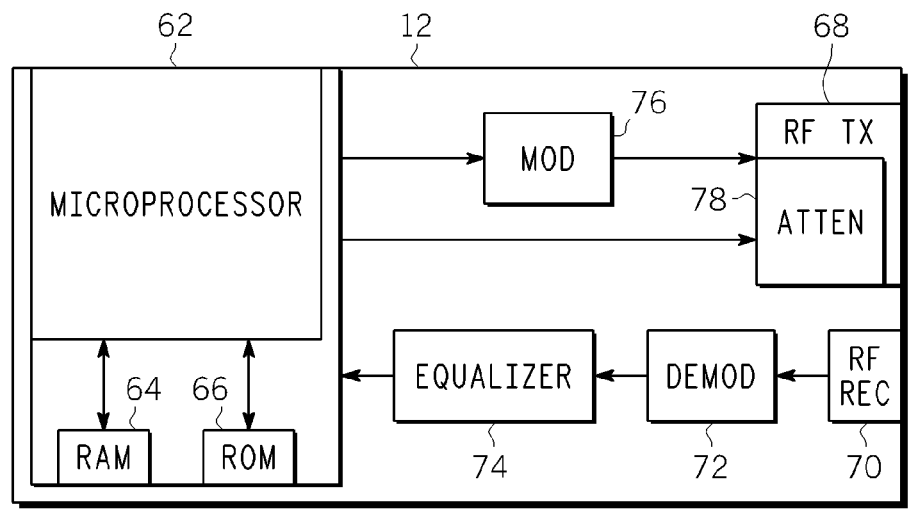
FIG. 4 illustrates an exemplary architecture of a network element which may communicate with an exemplary CMTS of the present invention.

FIG. 4 illustrates an exemplary network element 12, such as a cable modem. The network element 12 contains a processor 62 which communicates with a RAM 64 and ROM 66 and which controls the general operation of the network element 12, including the pre-equalization parameters and preamble lengths of communications sent by the network element 12 in accordance with instructions from the CMTS 20. The network element 12 also contains a transceiver (transmitter 68 and receiver 70) which provides bidirectional RF communication with the CMTS 20, a demodulator 72 which demodulates the signals received by the RF receiver 70, and an equalizer unit 74 which equalizes the communications received from the CMTS 20. The network element 12 also contains a modulator 76 which modulates signals to be transmitted upstream to the CMTS 20 according to a modulation scheme which the network element 12 has been instructed to use by the CMTS 20. In addition, the network element 12 has an attenuator 78 controlled by microprocessor 62 to attenuate signals to be transmitted by RF transmitter 68 to be within a desired power level. Those of skill in the art will appreciate that the components of network element 12 have been illustrated separately only for discussion purposes and that various components may be combined in practice.

By way of example, the network element 12 can be a DOCSIS network element, such as a cable modem, to generate a variety of test signals. Accordingly, the test signals may be implemented using one of the available upstream DOCSIS bandwidths, e.g. 200 kHz, 400 kHz, 800 kHz, 1600 kHz, 3200 kHz or 6400 kHz.

With respect to the above described network, processes to determine whether impairments are appreciably degrading upstream plant performance in conjunction with measurements made at the headend via a CMTS and to determine the highest modulation complexity that may be supported with respect to the upstream HFC plant performance are described in commonly-assigned, co-pending U.S. patent application Ser. No. 11/613,823, filed on Dec. 20, 2006 and titled "Method and Apparatus for Characterizing Modulation Schemes in an HFC Network". This application published as U.S. Patent Application Publication No. 2008/0101210 A1 on May 1, 2008. With respect to these processes, a technician or engineer can remotely characterize the modulation schemes at a central location, such as the headend. This eliminates use of external test equipment, such as a vector signal analyzer, and the need for simultaneous deployment of technicians to various locations within the cable plant. All measurements required by these processes are made through the use of the existing terminal devices (e.g., DOCSIS terminal devices such as MTAs and cable modems) as well as headend equipment (e.g., a DOCSIS CMTS).

Accurate knowledge of the available and/or optimum modulation schemes of the network 10 enables the operator to utilize available resources of their network more efficiently, such as by adding additional network elements 12 to improve portions of the network with the least complex modulation schemes so that those portions may be able to use more complex modulation schemes.

Several methods are described herein and relate to making determinations with respect to which type of impairment is the dominant impairment being experienced on a communication channel or set of channels. For example, the methods disclosed herein enable the network operator to distinguish between a distortion-dominated environment, a noise-dominated environment, and an environment that is neither dominated by distortion nor noise. The knowledge of the dominant impairment enables a precise course of corrective action to be determined and taken. As an example, the methods make it possible to identify sources of nonlinear impairments, such as improperly configured amplifiers common to some cable modems. If a reduction of distortion impact in a distortion-dominated environment can be readily achieved, then higher order modulation schemes will likely be useable. Thus, a determination of the dominant impairment is extremely valuable information to the network operator, particularly if it can be provided automatically, remotely, and in an efficient, cost-effective manner.

With the foregoing in mind, the following methods are described separately below: (i) systematic examination of total power loading; (ii) systematic examination of signal power reduction; (iii) statistical examination of communication channel noise power; and (iv) systematic examination of interleaver effectiveness. Each relates to automatically diagnosing and characterizing HFC network distortion-based interference issues by monitoring the performance of a communication channel during a testing procedure. These methods enable a technician or engineer to remotely diagnose distortion-based interference issues relatively quickly without having to use external test equipment and without having to deploy technicians to various locations within the cable plant.

Systematic Examination of Total Power Loading

The so-called "total power loading" test is particularly useful in determining whether or not non-linear distortion is the dominant impairment on a HFC channel that has been determined to be impaired by an interference issue. Use of the test enables an operator to distinguish between interference dominated by non-linear distortion as opposed to other types of interference, such as noise, CPD or ingress. The test can be accomplished remotely in an automatic manner and permits a non-linear distortion impaired interference issue to be quickly diagnosed and characterized.

The term "total power loading" as used herein is defined as the summation of power of all RF energy present within a bandwidth of interest. By way of example, adding the power of all signals present in a typical North American CATV upstream band of, for instance, 5 to 42 MHz, can provide an estimate of total power loading. A more accurate approach of determining total power loading is provided by measuring the power of all RF energy present within a 5 to 42 MHz upstream band, including contributing signals, with a spectrum analyzer. Statistical metrics can also be used to further improve accuracy.

Figure 5:
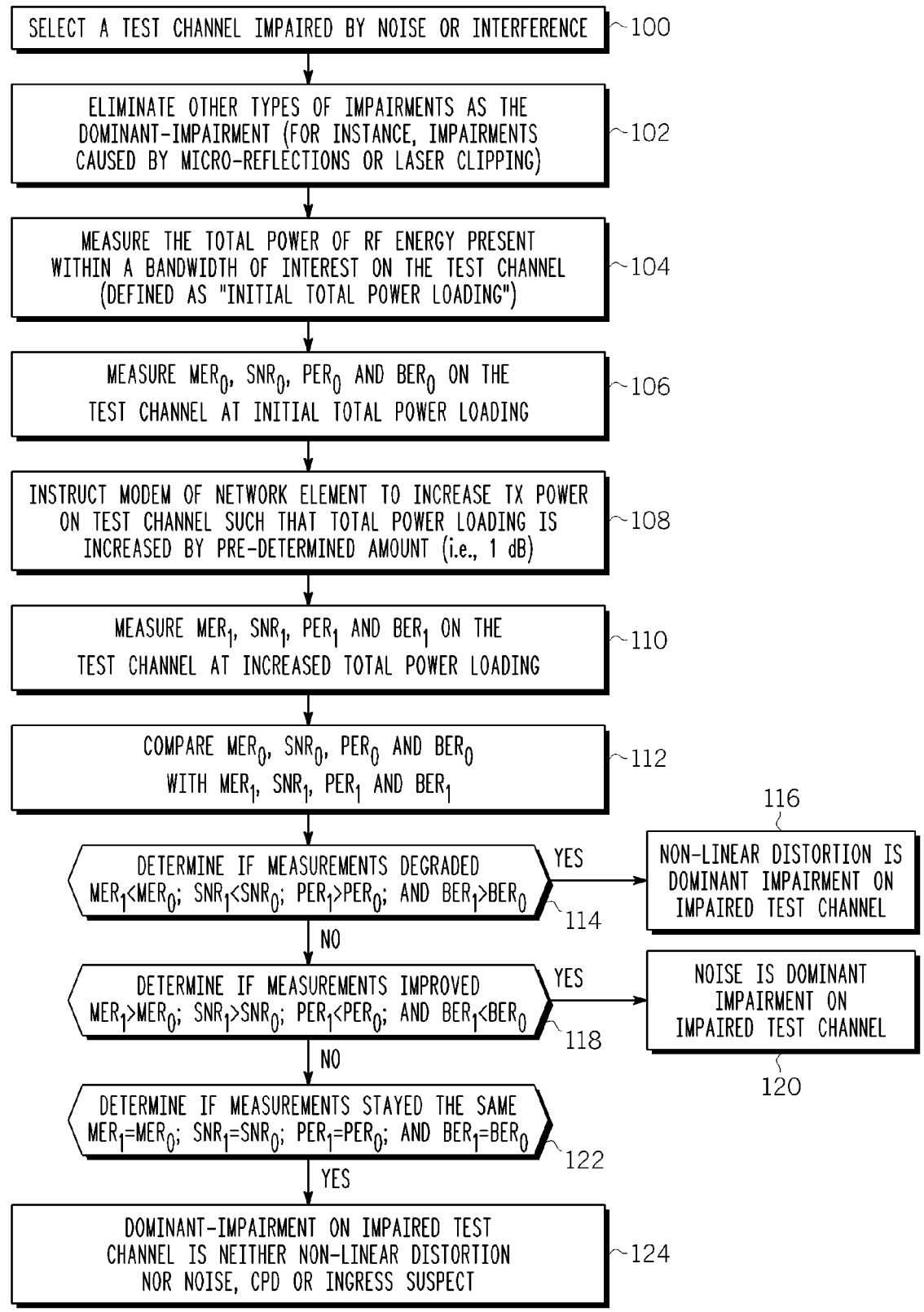
FIG. 5 is a flow chart illustrating the steps of a first process in accordance with the principles of the present invention.

According to the total power loading test, an active test channel or set of channels operating at a known modulation complexity is selected for testing. Typically, the test channel or set of channels will have been previously determined to be impaired by noise and/or interference. For example, the method described by commonly-assigned, co-pending U.S. patent application Ser. No. 11/613,823 can be used for this purpose. See step 100 in FIG. 5.

Before proceeding with the total power loading test, the test channel or set of channels can be subject to other testing with respect to determining whether or not other types of impairments are the cause of the noise and/or interference issue. See step 102 in FIG. 5. By way of example, tests for impairments caused by micro-reflections and laser clipping can be performed to eliminate these types of impairments as the cause of return path performance degradation on the test channels or set of channels. Such tests are described, for instance, in commonly-assigned, co-pending U.S. patent application Ser. No. 11/608,028, filed on Dec. 7, 2006 and titled "Method and Apparatus for Determining Micro-Reflections in a Network" and U.S. patent application Ser. No. 11/610,177, filed on Dec. 13, 2006 and titled "Method and Apparatus for Determining the Dynamic Range of an Optical Link in an HFC Network". The '028 application published as U.S. Patent Application Publication No. 2008/0140823 A1 on Jun. 12, 2008, and the '177 application published as U.S. Application Publication No. 2007/0223920 A1 on Sep. 27, 2007.

The first step of the total power load test is to measure the total power present within the band using the FFT feature of the DOCSIS CMTS 20. This measurement provides total power loading. See step 104 in FIG. 5.

Thereafter, an idle modem of a terminal network element 12 is instructed by the CMTS 20 to generate a signal at a given modulation level on the test channel or set of channels being tested. Parameters are monitored by the CMTS 20 at the headend 14, such as by the spare receiver 50, via the return path of the network 10. In the present method, the parameters that are monitored for the target modem population include modulation error ratio (MER), signal-to-noise ratio (SNR), packet error rate (PER), and bit error rate (BER). The initial measurements at the initial total power level for the target modem population are designated $MER_0$, $SNR_0$, $PER_0$ and $BER_0$. See step 106 in FIG. 5.

After the above referenced initial measurements are obtained, the modem 12 is instructed by the CMTS 20 to generate an additional signal of increased power on the test channel or set of channels such that total power loading is increased by a predetermined amount, for instance, 1 dB. See step 108 in FIG. 5. The same parameters are again monitored at the headend 14 by the CMTS 20. These set of measurements for the target modem population are designated as $MER_1$, $SNR_1$, $PER_1$ and $BER_1$. See step 110 in FIG. 5.

After the measurements of, $MER_0$, $SNR_0$, $PER_0$, $BER_0$, $MER_1$, $SNR_1$, $PER_1$ and $BER_1$ are obtained, the measurements are compared to determine whether or not the measurements degraded, improved, or stayed the same. See step 112 in FIG. 5. Based on the results of the comparison, an operator should be able to conclude whether the impairment of the tested channel or set of channels is the result of a non-linear distortion-dominated environment, a noise dominated environment, or neither.

According to the total power load test, if all of the measurements of MER, SNR, PER and BER degrade at the increased power level relative to the initial power level, then the channel or set of channels is likely non-linear distortion-impaired. See steps 114 and 116 of FIG. 5. Degraded measurements are determined when: $MER_1 < MER_0$; $SNR_1 < SNR_0$; $PER_1 > PER_0$ and $BER_1 > BER_0$. If measurements for some cable modems show degradation and others do not, then common elements in the path between the degraded cable modems and the CMTS are likely attributed to nonlinear contribution. The distortion determined by this test is non-linear impairments, such as produced by an improperly configured amplifier. Such distortion is also referred to as Intermodulation Distortion (IMD).

Alternatively, if all of the measurements of MER, SNR, PER and BER improve at the increased power level, then the channel or set of channels is impaired by noise. Improved measurements are determined when: $MER_1 > MER_0$; $SNR_1 > SNR_0$; $PER_1 < PER_0$ and $BER_1 < BER_0$. See steps 118 and 120 of FIG. 5.

Finally, if the measurements of MER, SNR, PER and BER taken during the test remain substantially the same at the initial and increased power level, then the channel or set of channels is likely neither non-linear distortion-dominated nor noise-dominated. In this case, $MER_1 = MER_0$; $SNR_1 = SNR_0$; $PER_1 = PER_0$ and $BER_1 = BER_0$. The dominant impairment is likely Common Path Distortion (CPD) or ingress. CPD is self-generated mainly due to connector corrosion and connectors acting as diodes. Ingress describes any interference that is coupled into the return path via an external source. The predominant coupling mechanism for ingress is a poorly shielded drop coaxial cable that is acting more like an antenna then a drop cable. See steps 122 and 124 of FIG. 5.

The above referenced total power loading test can be used to provide comprehensive data available from multiple test points thereby providing great visibility into the RF plant. The utilization of a large number of end user cable modems 12 makes it possible to quickly identify sources of impairments in the network 10. For instance, this enables the non-linear distortions to be identified and eliminated, such as by properly configuring or replacing an amplifier deemed to be the source of a non-linear distortion.

The total power loading test is limited to use during a maintenance window of the cable operator. This is because the additional power required by the second set of measurements may impact active services present on the HFC plant. This test should be performed at a time when the active return path is providing services and not in conjunction with other changes in the network, such as changing of optical routing, ingress level switching, or any other routine or event that will likely cause RF levels to be unstable. In addition, the test requires the availability of theoretical PER and BER as a function of SNR and MER.

Systematic Examination of Signal Power Reduction

The so-called "signal power reduction" test is particularly useful in determining whether or not the dominant impairment of a communication channel is the result of Additive White Gaussian Noise (AWGN) or distortion. The test can be accomplished remotely in an automatic manner and permits a distortion impaired channel to be quickly and readily discernable from an AWGN-dominated channel.

Figure 6:
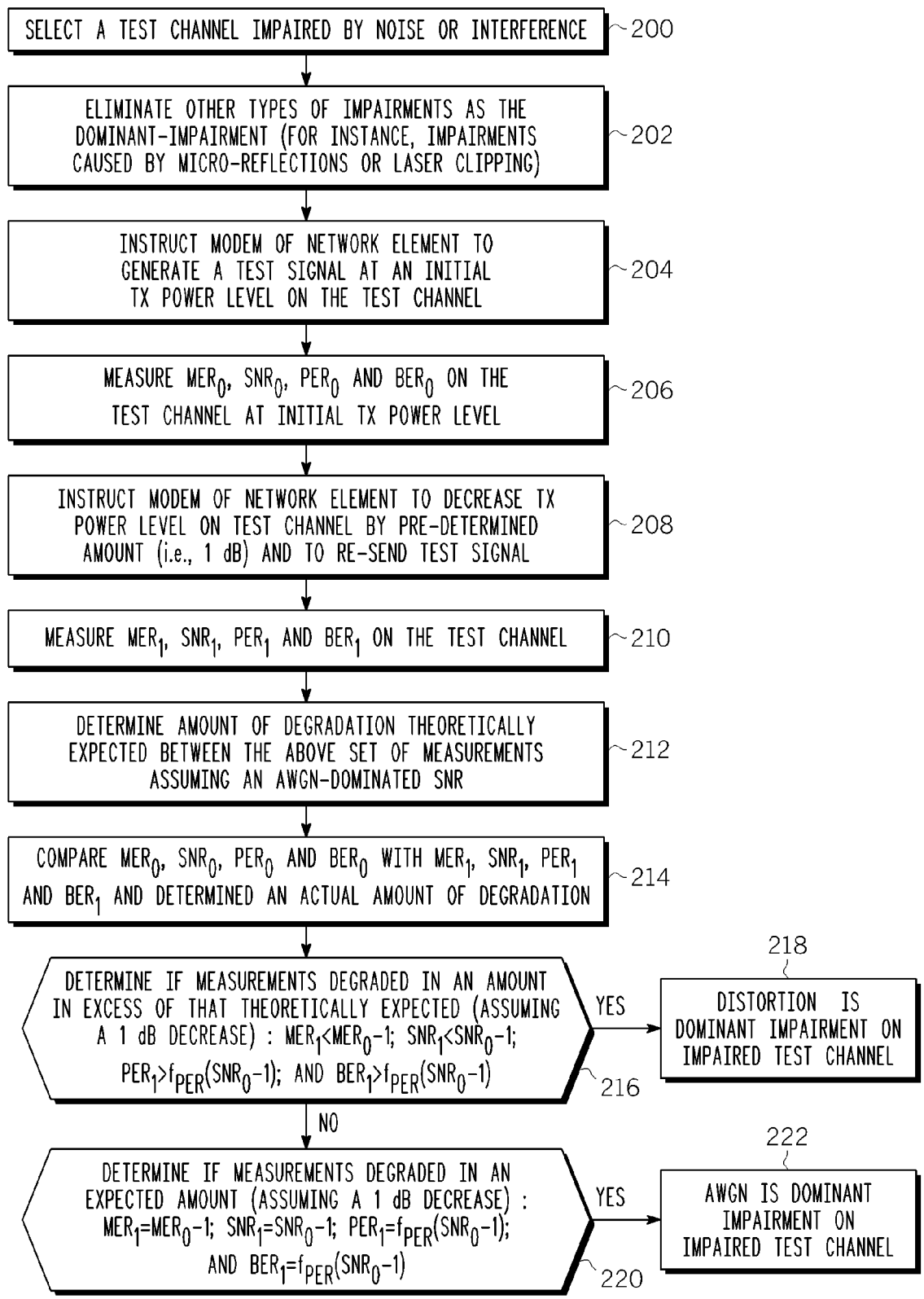
FIG. 6 is a flow chart illustrating the steps of a second process in accordance with the principles of the present invention.

According to the method, an active test channel operating at a known modulation complexity is selected for testing. See step 200 in FIG. 6. Typically, the active test channel will have been identified as being dominated by AWGN and may have been determined to be impaired by interference via use of the method described by commonly-assigned, co-pending U.S. patent application Ser. No. 11/613,823.

Before proceeding with the test, the test channel can be subject to other testing with respect to determining whether or not other types of impairments are the cause of the interference issue. See step 202 in FIG. 6. By way of example, tests for impairments caused by micro-reflections and laser clipping can be performed to eliminate these types of impairments as the cause of return path performance degradation on the active test channel. Such tests are described, for instance, in commonly-assigned, co-pending U.S. patent application Ser. No. 11/608,028 and U.S. patent application Ser. No. 11/610,177.

The signal power reduction test begins when the CMTS 20 instructs an idle modem of a terminal network element 12 to generate a test signal at a given modulation level and at an initial power level on the active test channel. See step 204 in FIG. 6. Parameters are monitored by the CMTS 20 at the headend 14, such as by the spare receiver 50, via the return path of the network 10. In the present method, the parameters that are monitored for the target modem population include modulation error ratio (MER), signal-to-noise ratio (SNR), packet error rate (PER), and bit error rate (BER). The initial measurements are designated $MER_0$, $SNR_0$, $PER_0$ and $BER_0$. See step 206 in FIG. 6.

After the above referenced initial measurements are obtained, the modem is instructed to generate an additional test signal at a decreased level of power on the test channel. For example, the power level of the signal can be decreased by 1 dB relative to the power level of the initial test signal. See step 208 in FIG. 6. The same parameters are again monitored at the headend 20. These set of measurements are designated as $MER_1$, $SNR_1$, PER, and $BER_1$. See step 210 in FIG. 6.

As stated above, this test is particularly useful for channels that have been preliminary identified as being dominated by AWGN. Based on this preliminary information, a determination is made as to the amount of degradation of the second set of measurements relative to the first set of measurements theoretically expected by the decreased power degradation in AWGN-dominated SNR. See steps 212 and 214 in FIG. 6. If a comparison of the measurements indicate that they have degraded by an amount in excess of that theoretically expected, then the test reveals that the dominant impairment of the active test channel is distortion. See steps 216 and 218 in FIG. 6. Alternatively, if the degradations between the measurements are substantially equal to that theoretically expected, then the dominant impairment is AWGN. See steps 220 and 222 in FIG. 6.

By way of example, in the event of a distortion impaired test channel in which the power level decrease of the test signal is 1 dB, the following conditions will be met: $MER_1 < MER_0 - 1$; $SNR_1 < SNR_0 - 1$; $PER_1 > f_{PER}(SNR_0 - 1)$; and $BER_1 > f_{BER}(SNR_0 - 1)$. Alternatively, if the dominant impairment is AWGN, then the following conditions will be present: $MER_1 = MER_0 - 1$; $SNR_1 = SNR_0 - 1$; $PER_1 = f_{PER}(SNR_0 - 1)$; and $BER_1 = f_{BER}(SNR_0 - 1)$.

The above referenced signal power reduction test can be applied at any time within or outside of a maintenance window of a network operator. This test should be performed at a time when the active return path is providing services and not in conjunction with other changes in the network, such as changing of optical routing, ingress level switching, or any other routine or event that will likely cause RF levels to be unstable. In addition, the test requires that theoretical PER and BER as a function of SNR and MER are available.

This test is limited to validating the performance of a test channel relative to wideband interference or distortion. While it may be likely that other active signals present within the same spectrum will also be dominated by similar distortion, this test may not be able to conclusively verify such a dominant impairment.

Statistical Examination of Channel Noise Power

The so-called "channel noise" test is useful in determining whether or not the dominant impairment of a communication channel is the result of Additive White Gaussian Noise (AWGN) or distortion. The test can be accomplished remotely in an automated manner and permits an impaired channel dominated by distortion to be quickly and readily discernable from an impaired channel dominated by noise.

Figure 7:
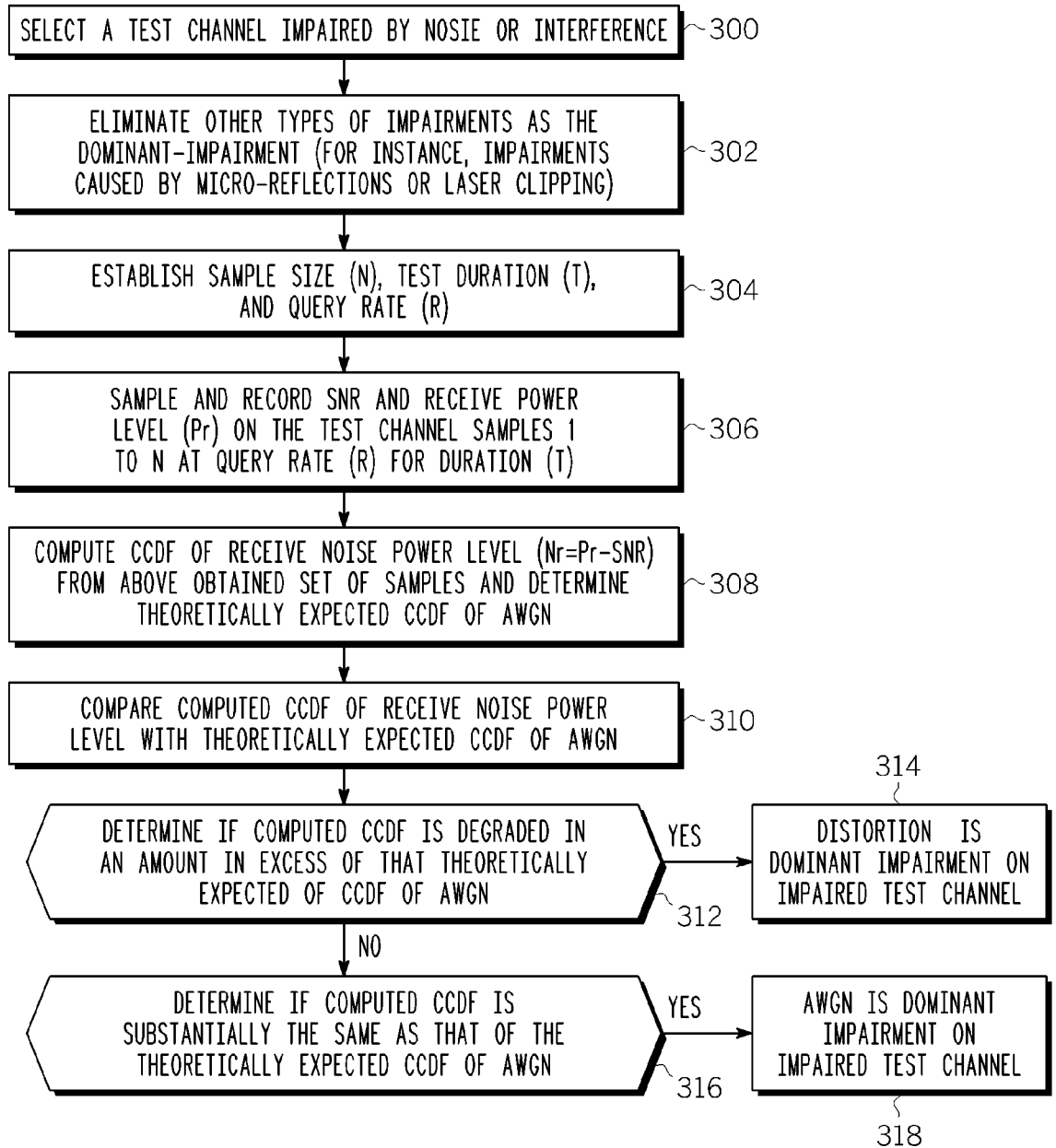
FIG. 7 is a flow chart illustrating the steps of a third process in accordance with the principles of the present invention.

According to the method, an active test channel operating at a known modulation complexity is selected for testing. See step 300 in FIG. 7. Typically, the active test channel will have been preliminarily identified as being dominated by AWGN and may also have been determined to be impaired by interference via use of the method described by commonly-assigned, co-pending U.S. patent application Ser. No. 11/613,823.

Before proceeding with the test, the test channel can be subject to other testing with respect to determining whether or not other types of impairments are the cause of the interference issue. See step 302 in FIG. 7. By way of example, tests for impairments caused by micro-reflections and laser clipping can be performed to eliminate these types of impairments as the cause of return path performance degradation being experienced on the active test channel. Such tests are described, for instance, in commonly-assigned, co-pending U.S. patent application Ser. No. 11/608,028 and U.S. patent application Ser. No. 11/610,177.

Unlike the tests previously described, the channel noise test utilizes a statistical-based approach. So-called Complementary Cumulative Density Functions (CCDFs) are a statistical measure of the likelihood of occurrence of a sample $X_i$, given that $X_i$ could be any one sample contained within a set of samples $X_1 \ldots X_n$. Thus, a CCDF provides a snapshot of the probability of occurrence associated with sample $X_i$. In the present test, a comparison of two CCDF functions is undertaken, one with respect to AWGN-dominated noise power samples and another with respect to distortion-dominated noise power samples. This comparison requires that the sample sets be normalized to an average power ($X_{avg}$) of each sample set. Average power ($X_{avg}$) is calculated as the summation of all sample values divided by the number of samples, n. This statistical-based test requires that consideration be given to the effects of the Central Limit Theorem (CLT), which holds that sample sets of a known average and variance values will have a tendency toward a Gaussian or normal distribution provided that the sample sets are sufficiently large.

Accordingly, the present test requires an evaluation of how the number of contributing CATV digital signals impact the noise power CCDF of a distortion-dominated communication channel. The present test is based on the theory that a typical CATV downstream environment of 55-1,000 MHz of 6 MHz digital signals mixing together to create a distortion-dominated communication channel will produce a noise power CCDF that will be readily discernable from an AWGN CCDF. For an example, see FIG. 13. More specifically, peak-to-average noise power measurements in either the upstream or downstream test channel in a distortion-dominated environment will produce a peak-to-average noise power value that is greater than that which would be expected of AWGN peak-to-average noise power.

Figure 9:
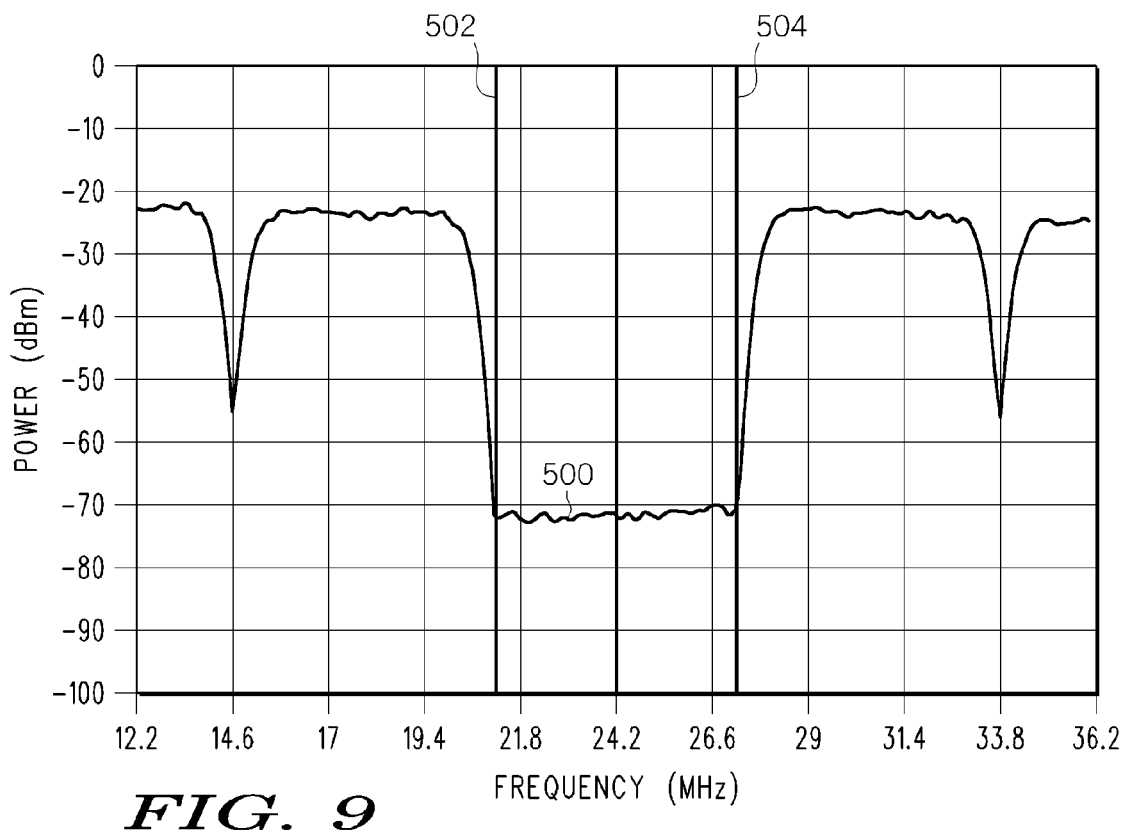
FIG. 9 illustrates an example of a channel spectrum of a downstream test communication channel.

Based on the above, the present test requires noise-floor samples to be taken of either the upstream or downstream test channel. As an example, FIG. 9 is a channel spectrum 500 of a downstream test channel, and the bold vertical lines 502 and 504 in FIG. 9 highlight a 6 MHz notch between QAM carriers. For FIG. 9, the 6 MHz channel power in the notch is −58.369 dBm, range is −10 dBm, RBW is 300 kHz, and RMS Averaging is 128 samples. The noise-floor samples are taken for purposes of producing statistically significant CCDF curves for comparison with theoretically expected AWGN CCDFs. With this information, an operator will be able to discern a distortion-dominated environment from a noise-dominated environment and will be able to take corrective actions in a more efficient manner given this information.

The first step of the channel noise test is to establish a sample size, N, and test duration, T, that provides an optimal compromise between query rate, R, and statistically significant results that sufficiently represent the population of test signals over the test duration, T. See step 304 in FIG. 7. After these values have been developed, the next step is to sample and record signal-to-noise ratio (SNR) and receive power level ($P_r$) measurements for the active test channel or channels as sample numbers one through N at a query rate R for duration T. See step 306 in FIG. 7. These parameters can be monitored and obtained by the CMTS 20 at the headend 14, such as by the spare receiver 50, via the return path of the network 10.

After the above referenced and statistically significant sample set is obtained, the next step of the test is to compute CCDF of receive noise power level and compare this to the theoretically expected CCDF of AWGN. By way of definition, receive noise power level ($N_r$) is calculated as follows: $N_r = P_r - SNR$. See steps 308 and 310 in FIG. 7.

If the computed CCDF obtained from the sample set is degraded by amounts in excess of that which would be theoretically expected relative to the CCDF of AWGN, then this indicates a distortion-dominant impairment. See steps 312 and 314 of FIG. 7 and the comparison of CCDFs 526 and 528 in FIG. 13. Of course, if the computed CCDF is substantially the same as the CCDF of AWGN, then the dominant-impairment of the channel is likely noise, not distortion. See steps 316 and 318 of FIG. 7 and the comparison of CCDFs 516 and 518 in FIG. 11.

Figure 10:
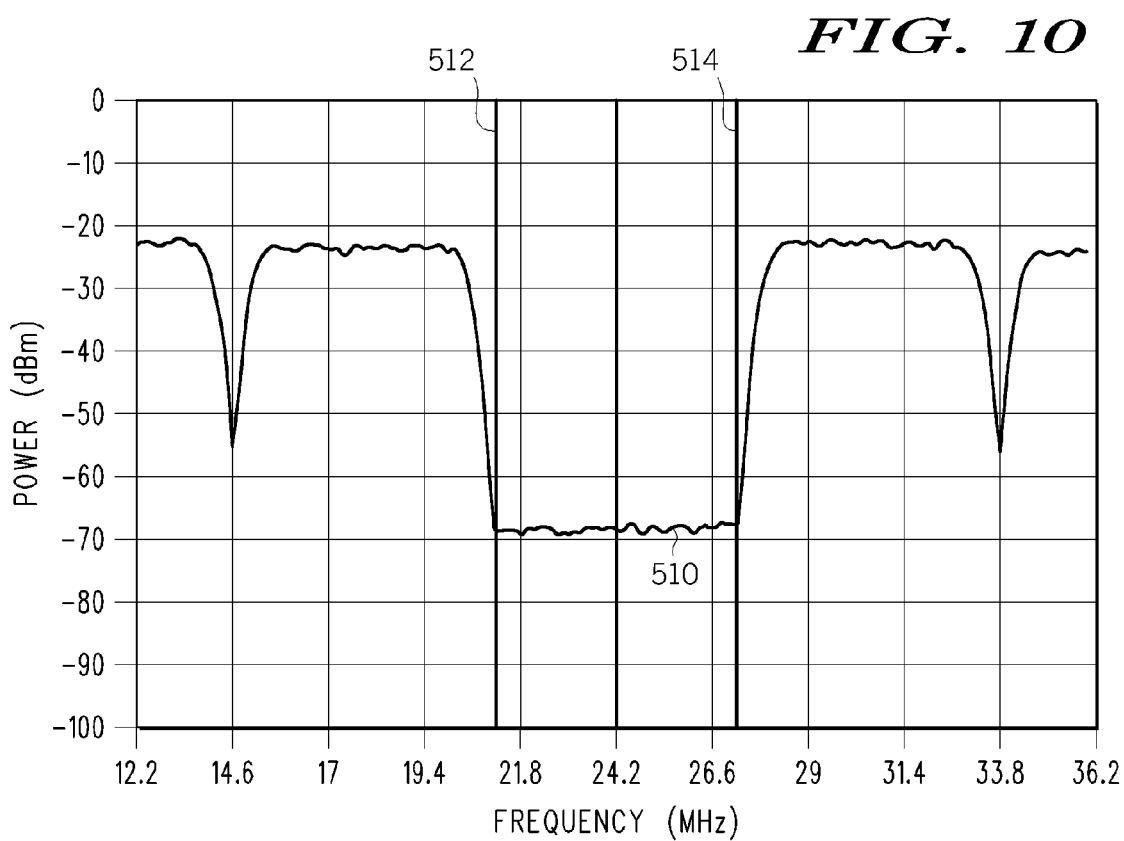
FIG. 10 illustrates an example of a channel spectrum of an impaired downstream test communication channel in which noise is the dominant impairment.
Figure 11:
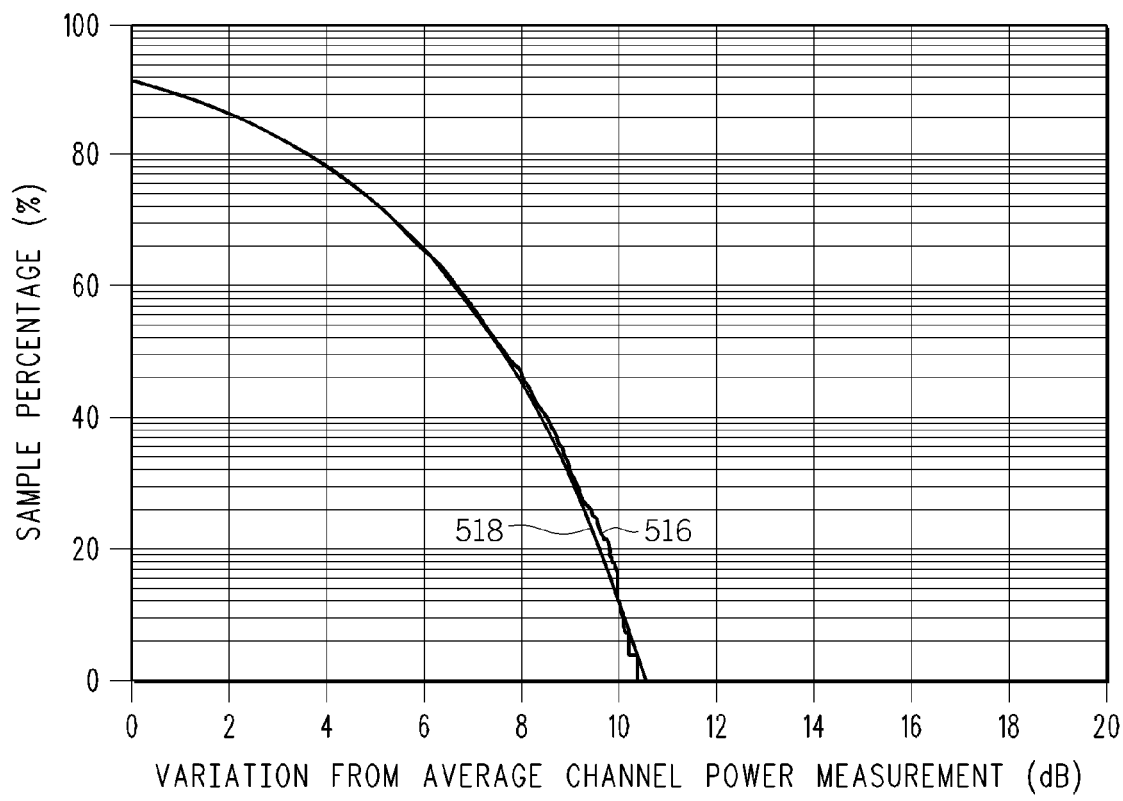
FIG. 11 illustrates a comparison of a Complementary Cumulative Density Function (CCDF) computed from noise power samples of an impaired communication channel in which noise is the dominant impairment relative to a theoretically expected noise power CCDF of Additive White Gaussian Noise (AWGN)

For purposes solely for example, FIG. 10 is a channel spectrum 510 of a downstream test channel that is impaired by noise, and the bold vertical lines 512 and 514 in FIG. 10 highlight a 6 MHz notch between 4 QAM carriers. The notch is filled with noise from a noise generator. For FIG. 10, the 6 MHz channel power in the notch is −55.465 dBm, range is −10 dBm, RBW is 300 kHz, and RMS Averaging is 128 samples. By recording data according to the channel noise test described above, a noise power CCDF is prepared for this test channel and is shown in FIG. 11. For FIG. 11, the 6 MHz channel power is −41.76 dBm, range is 100 mV, and RMS Averaging is 125,000 samples. As clearly illustrated in FIG. 11, the computed noise power CCDF 516 is substantially the same and substantially overlies the CCDF of AWGN 518.

Figure 12:
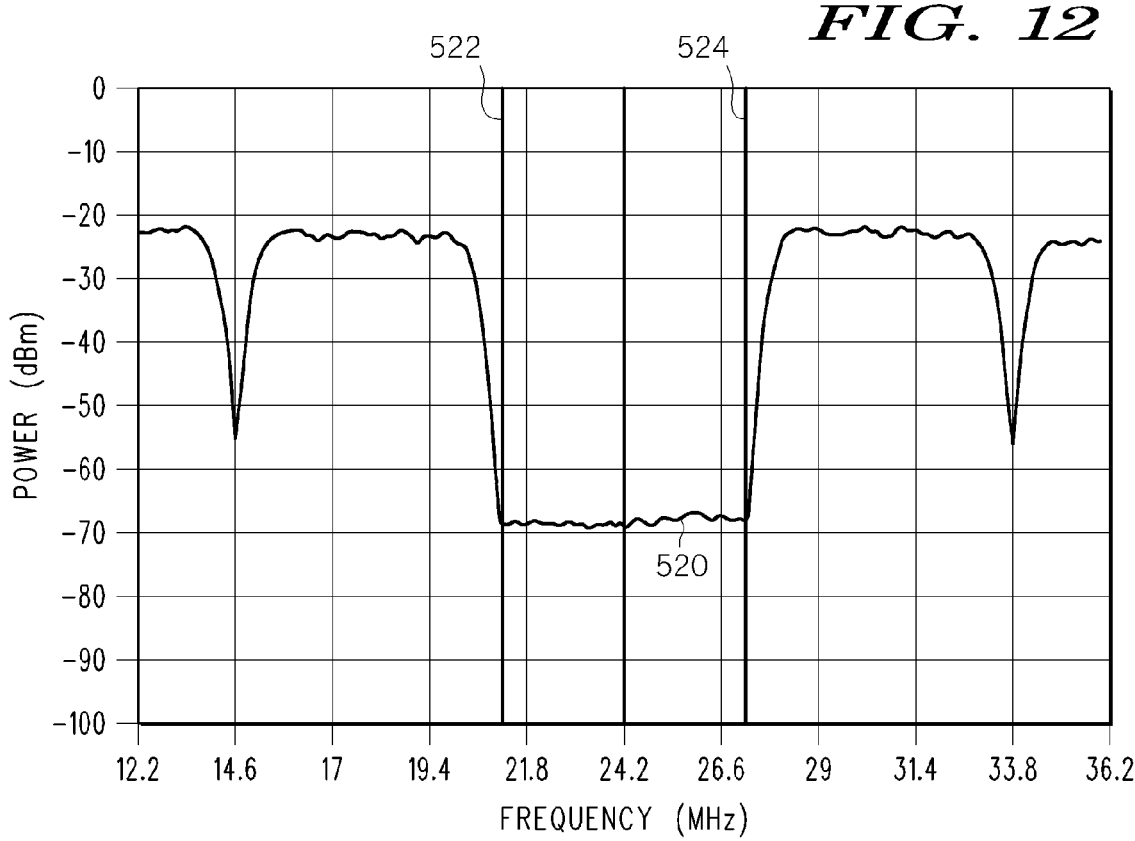
FIG. 12 illustrates an example of a channel spectrum of an impaired downstream test communication channel in which distortion is the dominant impairment.
Figure 13:
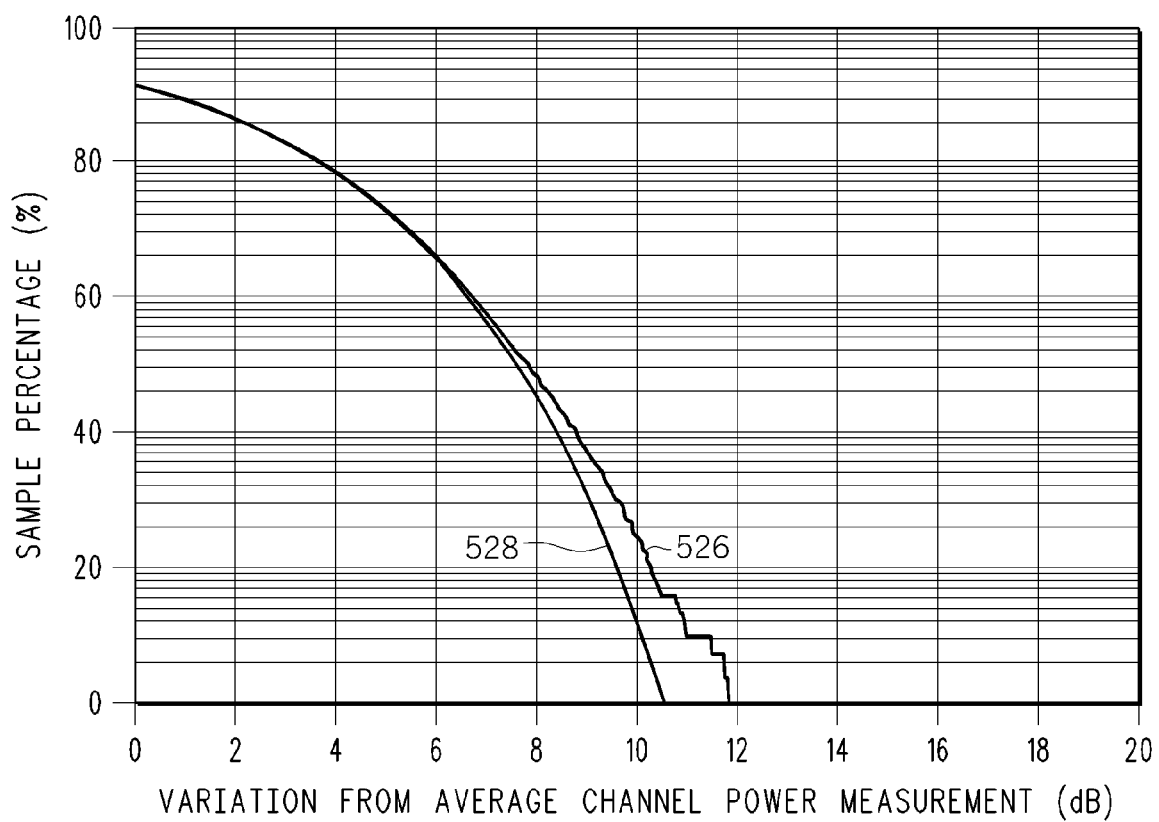
FIG. 13 illustrates a comparison of a Complementary Cumulative Density Function (CCDF) computed from noise power samples of an impaired communication channel in which distortion is the dominant impairment relative to a theoretically expected noise power CCDF of Additive White Gaussian Noise (AWGN).

By way of comparison, FIG. 12 is a channel spectrum 520 of a downstream test channel that is impaired by distortion, and the bold vertical lines 522 and 524 in FIG. 12 highlight a 6 MHz notch between 4 QAM carriers. The notch is filled with distortion. For FIG. 12, the 6 MHz channel power in the notch is −55.545 dBm, range is −10 dBm, RBW is 300 kHz, and RMS Averaging is 128 samples. By recording data according to the channel noise test described above, a noise power CCDF is prepared for this test channel and is shown in FIG. 13. For FIG. 13, the 6 MHz channel power is −41.79 dBm, range is 100 mV, and RMS Averaging is 125,000 samples. As clearly illustrated in FIG. 13, the computed noise power CCDF 526 is not substantially the same and is offset from the CCDF of AWGN 528. In this manner, the dominant impairment can be determined.

The above referenced channel noise power test can be accomplished at any time within or outside of a maintenance window of the network operator. This test should be performed at a time when the active return path is providing services and not in conjunction with other changes in the network, such as changing of optical routing, ingress level switching, or any other routine or event that will likely cause RF levels to be unstable. In addition, the test requires that a theoretical AWGN noise CCDF for the test channel is available.

Systematic Examination of Interleaver Effectiveness

The so-called "interleaver effectiveness" test is useful for revealing the burst duration nature of an interference on a communication channel. Knowledge of the upper bounded burst duration of the interference better enables a course of corrective action to be taken for reducing the impact of the interference on the channel. For example, knowledge of the burst duration nature of the interference enables narrowband interferences to be discernable from wideband interferences.

By way of example, DOCSIS 2.0 devices support five interleaver settings ranging in burst protection of 5.9 to 95 μsec for 64-QAM, and DOCSIS 3.0 devices support twelve interleaver settings ranging in burst protection of 5.9 to 759 μsec for 64-QAM. These settings provide use of the technique known as interleaving which minimizes the effect of burst errors by spreading data over time. For example, data symbols are intermixed at the transmit end and are reassembled on the receive end so that the errors are spread apart at the receive end and so that forward error correction (FEC) can effectively correct such errors. With respect to the interleaver settings of DOCSIS 2.0, the number of taps (I) and the increment (J) for the highest amount of interleaving is I=128: J=1. This setting indicates that 128 codewords made of 128 symbols each will be intermixed on a 1 to 1 basis. In contrast, the lowest amount of interleaving is provided by setting I=8: J=16 which indicates that 16 symbols are kept in a row per codeword and are intermixed with 16 symbols from 7 other codewords.

In the present method, these interleaving settings are used to determine the burst duration of an interference on an impaired communication channel. Burst periods of analog distortion beats may be as high as 200 μsec or more, whereas burst durations of other types of interference, such as noise, are different, and the length of the burst period can be used to distinguish between different types of interference. In addition, the optimum interleaver setting can be determined with respect to mitigating interference impact on the communication channel.

The interleaver effectiveness test takes advantage of the fact that changes in Interleaver Burst Protection for an interference-impaired signal will result in changes in BER and PER measurements. Thus, the burst protection setting of the DOCSIS devices can be systematically increased from a lowermost setting toward the highest setting and DOCSIS generated test signals can be measured with respect to BER and PER performance. If greater burst protection is required to improve BER and PER to a minimum acceptable performance, then this indicates that the interference-dominated environment for the test channel is upper bounded by the interleaver setting's burst protection capability.

Figure 8:
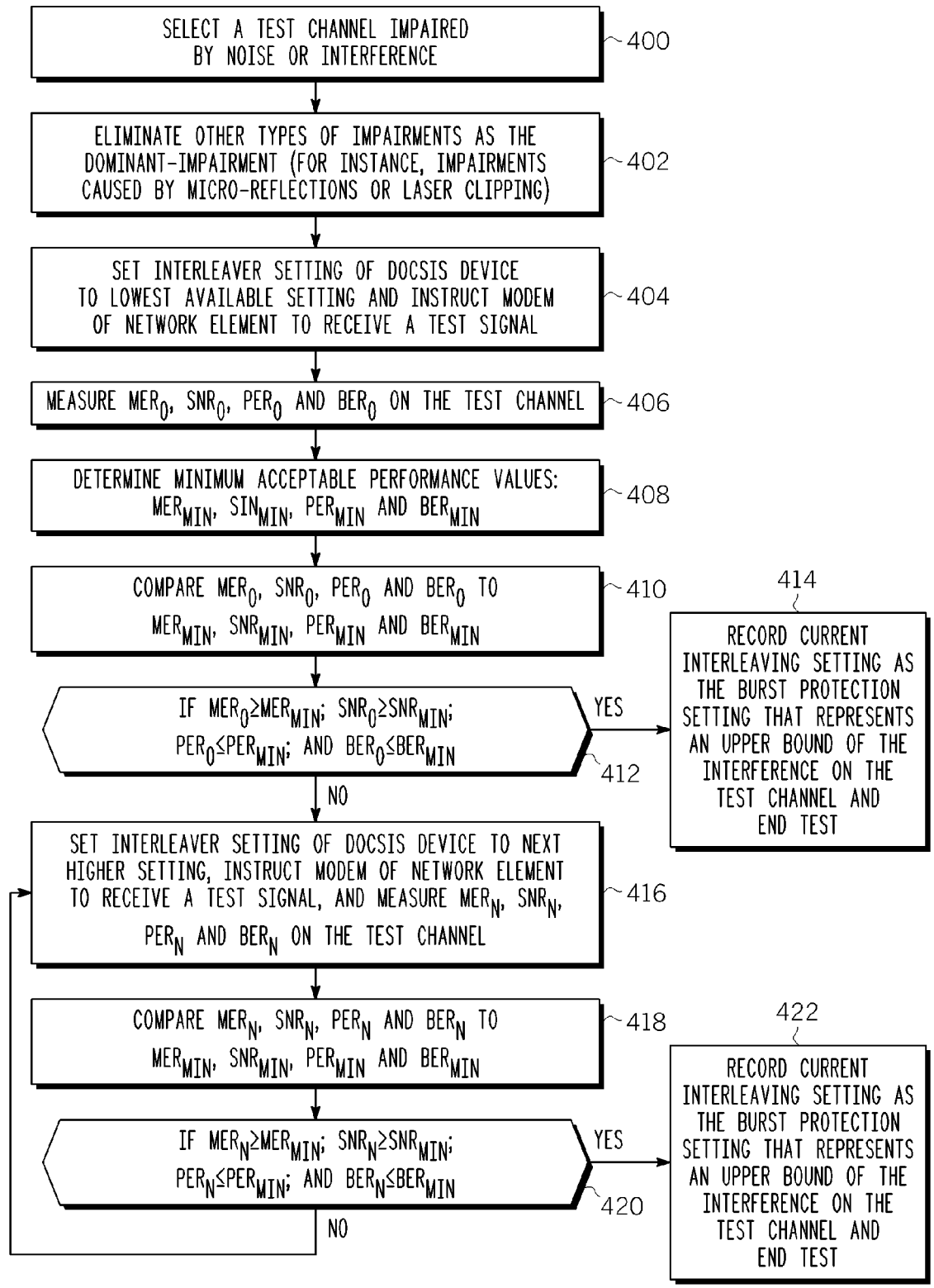
FIG. 8 is a flow chart illustrating the steps of a fourth process in accordance with the principles of the present invention.

According to the method, a test channel or set of channels operating at a known modulation complexity is selected for testing. See step 400 in FIG. 8. Typically, the test channel or set of channels will have been previously determined to be impaired by interference. For example, the method described by commonly-assigned, co-pending U.S. patent application Ser. No. 11/613,823 can be used for this purpose.

Before proceeding with the interleaver effectiveness test, the test channel or set of channels can be subject to other testing with respect to determining whether or not other types of impairments are the cause of the interference issue. See step 402 in FIG. 8. By way of example, tests for impairments caused by micro-reflections and laser clipping can be performed to eliminate these types of impairments as the cause of return path performance degradation being experienced on the test channels or set of channels. Such tests are described, for instance, in commonly-assigned, co-pending U.S. patent application Ser. Nos. 11/608,028 and 11/610,177 referenced above.

The first step of the interleaver effectiveness test is to cause an idle modem of a terminal network element 12 to receive a signal at a given modulation level on the test channel or set of channels being tested. See step 404 in FIG. 8. During this step, the lowest available interleaver burst protection setting is used. For example, the setting can be I=8, J=16 and correspond to 5.9 μsec for 64-QAM. Parameters are monitored by the CMTS 20 at the headend 14, such as by the spare receiver 50, via the return path of the network 10. In the present method, the parameters that are monitored include modulation error ratio (MER), signal-to-noise ratio (SNR), packet error rate (PER), and bit error rate (BER). The initial measurements at the lowest available interleaver setting are designated $MER_0$, $SNR_0$, $PER_0$ and $BER_0$. See step 406 in FIG. 8.

The test requires that Minimal Acceptable Performance (MAP) metrics be defined for each of MER, SNR, PER and BER. These are designated as $MER_{min}$, $SNR_{min}$, $PER_{min}$ and $BER_{min}$. See step 408 in FIG. 8.

After the measurements of $MER_0$, $SNR_0$, $PER_0$ and $BER_0$ are obtained, they are compared to the minimal acceptable performance values. See step 410 in FIG. 8. If MER, SNR, PER and BER have improved or exceed minimal acceptable performance, then the test can be ended and the interleaver setting is recorded as the burst protection setting that represents an upper bound on the burst duration of the interference. See steps 412 and 414 in FIG. 8. For this to be true, the comparison needs to comply with the following: $MER_0 \geq MER_{min}$; $SNR_0 \geq SNR_{min}$; $PER_0 < PER_{min}$ and $BER_0 < BER_{min}$.

If the initial measurements at the lowest setting do not comply with the above equations, and therefore do not improve or exceed minimal acceptable performance, then the test continues with a new set of measurements. See step 416 in FIG. 8. However, before the new measurements are taken, the next higher interleaver burst protection setting available is applied to the test channel. For example, the next setting may be I=16: J=8. The new measurements at this setting are recorded as $MER_1$, $SNR_1$, $PER_1$ and $BER_1$.

After these measurements are obtained, they are compared to the minimal acceptable performance values. See step 418 in FIG. 8. If MER, SNR, PER and BER have improved or exceed minimal acceptable performance, then the test can be ended and the interleaver setting is recorded as the burst protection setting that represents an upper bound on the burst duration of the interference. For this to be true, the comparison needs to comply with the following: $MER_1 \geq MER_{min}$; $SNR_1 \geq SNR_{min}$; $PER_1 \leq PER_{min}$ and $BER_1 \leq BER_{min}$. See steps 420 and 422 in FIG. 8.

If the set of measurements at the second lowest setting do not comply with the above equations, and therefore do not improve or exceed minimal acceptable performance, then the test continues with a new set of measurements and new comparison relative to the minimal acceptable performance values. See step 416 in FIG. 8. This continues throughout all possible interleaver settings until a set of measurements are taken that complies with the above set of equations. At this point, the test is complete and the current interleaver setting is recorded as the burst protection setting that represents an upper bound on the burst duration of the interference. See step 422 in FIG. 8.

The above referenced interleaver effectiveness test can be accomplished at any time within or outside of a maintenance window of the test channel. This test should be not be performed in conjunction with other changes in the network, such as changing of optical routing, ingress level switching, or any other routine or event that will likely cause RF levels to be unstable.

The processes discussed above and illustrated in FIGS. 5-8 may be implemented in hard wired devices, firmware or software running in a processor. For example, the processing unit 24 contained in the CMTS 20 can be used for this purpose. Any of the above processes or required steps may be contained on a computer readable medium which may be read by microprocessor 26 of the CMTS 20. A computer readable medium may be any medium capable of carrying instructions to be performed by a microprocessor, including a CD disc, DVD disc, magnetic or optical disc, tape, silicon based removable or non-removable memory, packetized or non-packetized wireline or wireless transmission signals.

The methods and system described above enable a technician or engineer to remotely characterize the type of impairment that is the dominant impairment on an impaired communication channel, such as a HFC channel. These methods are accomplished at a central location, such as the headend 14, by using the Motorola Broadband Service Router 64000 (BSR 64000), rather than using external test equipment, such as a vector signal analyzer, and deploying technicians to various locations within the cable plant. An operator may use these methods to quickly identify and repair a network component introducing phase noise or narrowband interference to improve signal quality and network speed.

While the principles of the invention have been described above in connection with specific methods and systems, it is to be clearly understood that this description is made only by way of example and not as limitation on the scope of the invention as defined in the appended claims.

We claim:

1. A method for determining whether distortion or noise is the dominant impairment on an impaired communication channel, comprising the steps of:

establishing a sample size (N), a test duration, and a query rate for developing a complementary cumulative density function (CCDF) statistical measure of test signal measurements on a test channel;

selecting and remotely instructing a network element to transmit test signals on the test channel;

monitoring test signals at a headend of the test channel and recording measurements of signal-to-noise ratio (SNR) and Receive Power Level (Pr) on the test channel for samples 1 to N at the established query rate for the established duration;

developing a CCDF for Receive Noise Power Level (Nr) from samples 1 to N, where Nr=Pr−SNR for each sample;

obtaining a theoretically expected CCDF of Receive Noise Power Level for an Additive White Gaussian Noise (AWGN) dominated impairment on the test channel; and comparing the CCDF for Receive Noise Power Level developed from samples 1 to N relative to the theoretically expected CCDF of Receive Noise Power Level for an AWGN-dominated impairment and concluding therefrom whether the dominant impairment is distortion or noise.

2. A method according to claim 1, wherein, if the comparing step indicates that the CCDF for Receive Noise Power Level developed from samples 1 to N is degraded by an amount in excess of that of the theoretically expected CCDF of Receive Noise Power Level for an AWGN-dominated impairment, then the dominant impairment is concluded to be distortion.

3. A method according to claim 2, wherein, if the comparing step indicates that the CCDF for Receive Noise Power Level developed from the samples 1 to N is substantially the same as that of the theoretically expected CCDF of Receive Noise Power Level for an AWGN-dominated impairment, then the dominant impairment is concluded to be distortion.

4. A method according to claim 3, wherein all of said measuring, instructing, monitoring, developing, comparing, and concluding steps are accomplished automatically and remotely of the network element by a cable modem termination system (CMTS) unit at a headend of the test channel.

5. A method for determining a burst duration nature of a dominant impairment on an impaired communication channel, comprising the steps of:

obtaining a minimum acceptance performance value for at least one of modulation error ratio ($MER_{MIN}$), signal-to-noise ratio ($SNR_{MIN}$), packet error rate ($PER_{MIN}$), and bit error rate ($BER_{MIN}$) for a test signal on a test channel;

setting a current interleaver setting of the test channel to a lowest available setting and remotely instructing a network element to receive a test signal on the test channel;

monitoring the test signal at a headend of the test channel and measuring at least one of modulation error ratio (MER), signal-to-noise ratio (SNR), packet error rate (PER), and bit error rate (BER); and comparing the measurement taken for the test signal to the corresponding minimum acceptance performance value and determining therefrom whether the current interleaver setting represents an upper bound of the dominant impairment of the test channel.

6. A method according to claim 5, further comprising the steps of setting the current interleaver setting to the next highest available setting and remotely instructing the network element to receive the test signal on the test channel when the current interleaver setting is determined not to represent an upper bound of the dominant impairment of the test channel.

7. A method according to claim 6, further comprising the step of recording the current interleaver setting as the optimum burst protection setting when the current interleaver setting is determined to represent an upper bound of the dominant impairment of the test channel.

8. A method according to claim 7, wherein during said measuring steps, measurements are taken and recorded for each of modulation error ratio (MER), signal-to-noise ratio (SNR), packet error rate (PER), and bit error rate (BER).

9. A method according to claim 8, wherein if during said comparing step it is determined that, for the measurements taken at the current interleaver setting, $MER \geq MER_{MIN}$, $SNR \geq SNR_{MIN}$, $PER \leq PER_{MIN}$ and $BER \leq BER_{MIN}$, then the current interleaver setting is recorded as the optimum burst protection setting that represents an upper bound of the dominant impairment of the test channel.

10. A method according to claim 9, wherein if during said comparing step it is determined that, for the measurements taken at the current interleaver setting, $MER \leq MER_{MIN}$, $SNR \leq SNR_{MIN}$, $PER \geq PER_{MIN}$ and $BER \geq BER_{MIN}$, then the current interleaver setting is reset to the next highest available setting and the network element is instructed to receive the test signal on the test channel and said monitoring, measuring, comparing and determining steps are repeated.

11. A method according to claim 7, wherein all of said measuring, instructing, monitoring, comparing, and determining steps are accomplished automatically and remotely of the network element by a cable modem termination system (CMTS) unit at the headend of the test channel.

12. A system for characterizing a dominant impairment on an impaired communication channel, comprising:
a cable modem termination system (CMTS) unit configured to remotely instruct a network element to receive test signals on a forward path of a test channel;
said CMTS unit having a transmitter configured to transmit the test signals from the network element and a processing unit configured to measure and record signal-to-noise ratio (SNR) measurements for said test signals and configured to make comparisons relating to said measurements; and
said processing unit of said CMTS configured to automatically determine from said comparisons whether distortion or noise is the dominant impairment, and to automatically determine a burst protection setting that represents an upper bound of the dominant impairment on the test channel.

13. A system according to claim 12, wherein said CMTS is configured to sample and record SNR and Receive Power Level (Pr) measurements for the test signals on the test channel for samples 1 to N at a pre-determined query rate and for a pre-determined duration.

14. A system according to claim 13 wherein said processing unit is configured to compute a complementary cumulative density function (CCDF) statistical measure from said samples 1 to N for Receive Noise Power Level (Nr), where $Nr = Pr - SNR$ for each sample.

15. A system according to claim 14, wherein said processing unit is configured to compare the CCDF of Receive Noise Power Level computed from samples 1 to N relative to a theoretically expected CCDF of Receive Noise Power Level for an Additive White Gaussian Noise (AWGN) dominated impairment on the test channel.

16. A system according to claim 15, wherein said processing unit is configured to provide an indication that distortion is the dominant impairment on the test channel when the CCDF of Receive Noise Power Level computed from samples 1 to N is degraded in an amount in excess of that of the theoretically expected CCDF of Receive Noise Power Level for an AWGN dominated impairment.

17. A system according to claim 16, wherein said processing unit is configured to provide an indication that noise is the dominant impairment on the test channel when the CCDF of Receive Noise Power Level computed from samples 1 to N is substantially the same as that of the theoretically expected CCDF of Receive Noise Power Level for an AWGN dominated impairment.

18. A system according to claim 12, wherein said processing unit is configured to set and reset the interleaver setting of the test channel and measure and record measurements of modulation error ratio (MER), signal-to-noise ratio (SNR), packet error rate (PER), and bit error rate (BER) of test signals transmitted at different interleaver settings.

19. A system according to claim 18, wherein said processing unit is configured to compare the measurements of MER, SNR, PER and BER at a current interleaver setting relative to corresponding values corresponding to a minimum acceptance performance value for modulation error ratio ($MER_{MIN}$), signal-to-noise ratio ($SNR_{MIN}$), packet error rate ($PER_{MIN}$), and bit error rate ($BER_{MIN}$) for the test signal on the test channel, and wherein said processing unit is configured to compare the measurements taken for the test signal at the current interleaver setting to the corresponding minimum acceptance performance values and determine therefrom whether the current interleaver setting represents an upper bound of the dominant impairment of the test channel.

20. A system according to claim 19, wherein said processing unit is configured to reset the current interleaver setting to the next highest available setting and record new measurements until the measurements at the current interleaver setting comply with: $MER \geq MER_{MIN}$, $SNR \geq SNR_{MIN}$, $PER \leq PER_{MIN}$ and $BER \leq BER_{MIN}$; and wherein said processing unit is configured to provide an indication of the interleaver setting providing an optimum burst protection setting that represents an upper bound of the dominant impairment of the test channel.

* * * * *

UNITED STATES PATENT AND TRADEMARK OFFICE
CERTIFICATE OF CORRECTION

| | | |
|---|---|---|
| PATENT NO. | : 8,081,674 B2 | Page 1 of 1 |
| APPLICATION NO. | : 12/342733 | |
| DATED | : December 20, 2011 | |
| INVENTOR(S) | : Robert J. Thompson et al. | |

It is certified that error appears in the above-identified patent and that said Letters Patent is hereby corrected as shown below:

On the Title Page, Item [73] Assignee, delete the name "General Information Corporation" and replace with the proper name of Assignee, GENERAL INSTRUMENT CORPORATION.

Signed and Sealed this
Eighteenth Day of June, 2013

Teresa Stanek Rea
*Acting Director of the United States Patent and Trademark Office*